United States Patent [19]

Miller

[11] 4,269,374
[45] May 26, 1981

[54] COMBINED ROAD VEHICLE AND AIRCRAFT

[76] Inventor: Harvey R. Miller, 3655 E. Amazon, Eugene, Oreg. 97405

[21] Appl. No.: 1,876

[22] Filed: Jan. 8, 1979

[51] Int. Cl.³ .......................... B64C 37/00; B64C 3/56
[52] U.S. Cl. ............................................ 244/2; 244/49
[58] Field of Search .................... 244/2, 49, 36, 50, 87

[56] References Cited

U.S. PATENT DOCUMENTS

| | | | |
|---|---|---|---|
| 2,573,271 | 10/1951 | Perl | 244/49 |
| 2,811,323 | 10/1957 | Rethorst | 244/2 |
| 2,940,688 | 6/1960 | Bland | 244/2 |
| 2,989,269 | 6/1961 | Le Bel | 244/36 |
| 3,083,936 | 4/1963 | Rethorst | 244/49 |
| 3,371,886 | 3/1968 | Schertz | 244/2 |

*Primary Examiner*—Charles E. Frankfort
*Attorney, Agent, or Firm*—Eugene M. Eckelman

[57] ABSTRACT

The apparatus is convertible between road vehicle and aircraft forms having wing and tail assemblies as well as propelling structure that are movable outwardly for the flying form and movable inwardly in stored position for the road vehicle form. All of the parts of the apparatus remain intact in both the road and flying forms. Storage for the wing and tail assemblies and the propelling structure is in side and end compartments, and the wing and tail assemblies have foldable sections for this purpose. The apparatus has a pair of front wheels and a pair of rear wheels, the latter wheels being movable between a narrowed rearward position for road use which allows storage of the wings in the side compartments and a forward widened position for aircraft use. The tail assembly is supported on a slide mechanism which extends downward in a forward longitudinal direction whereby the tail assembly is lowered as it is moved forwardly for storage in the rear compartment.

5 Claims, 18 Drawing Figures

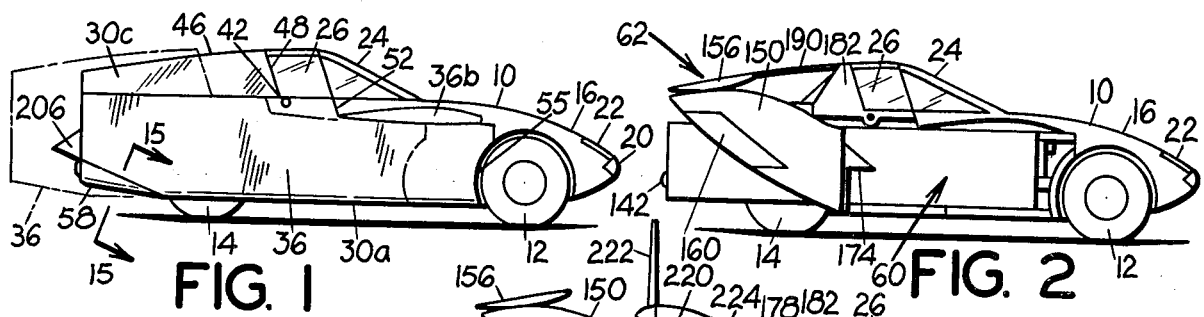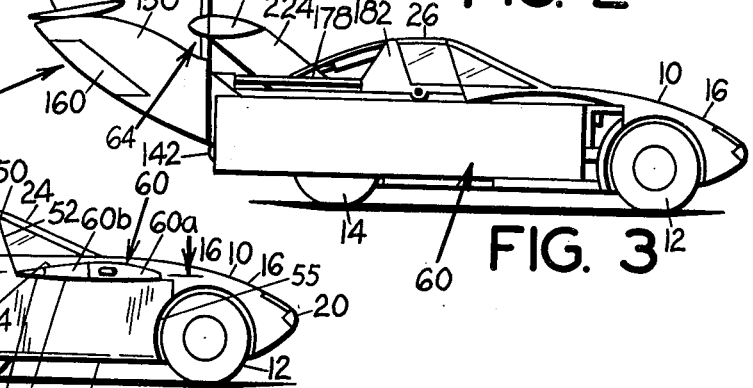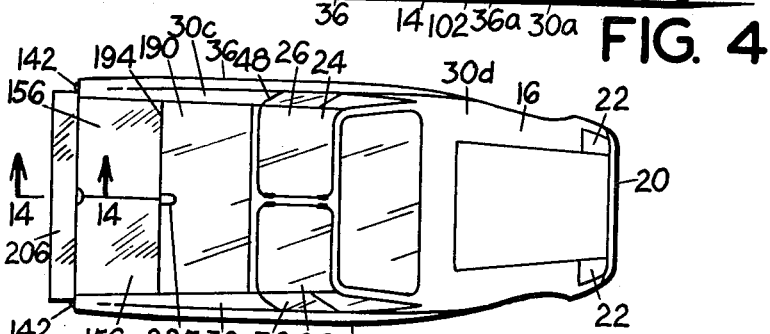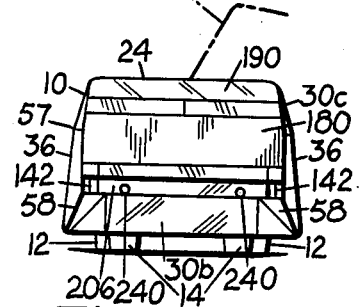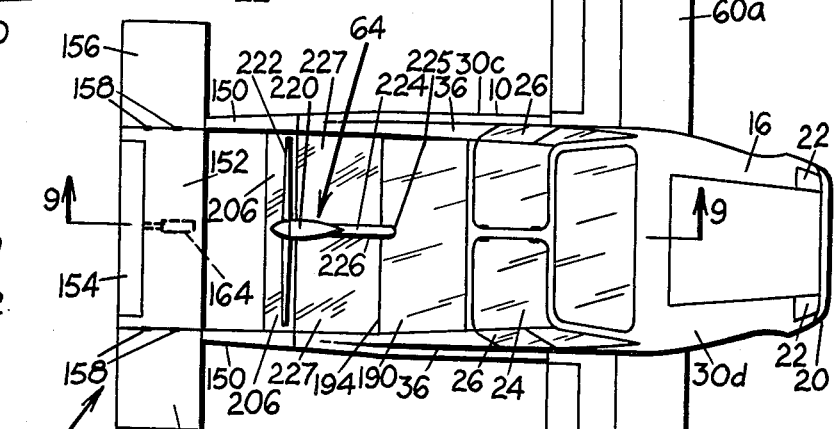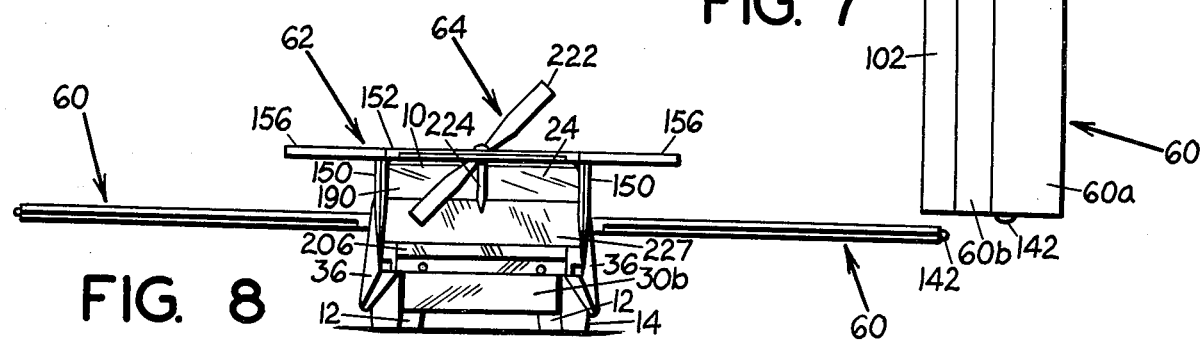

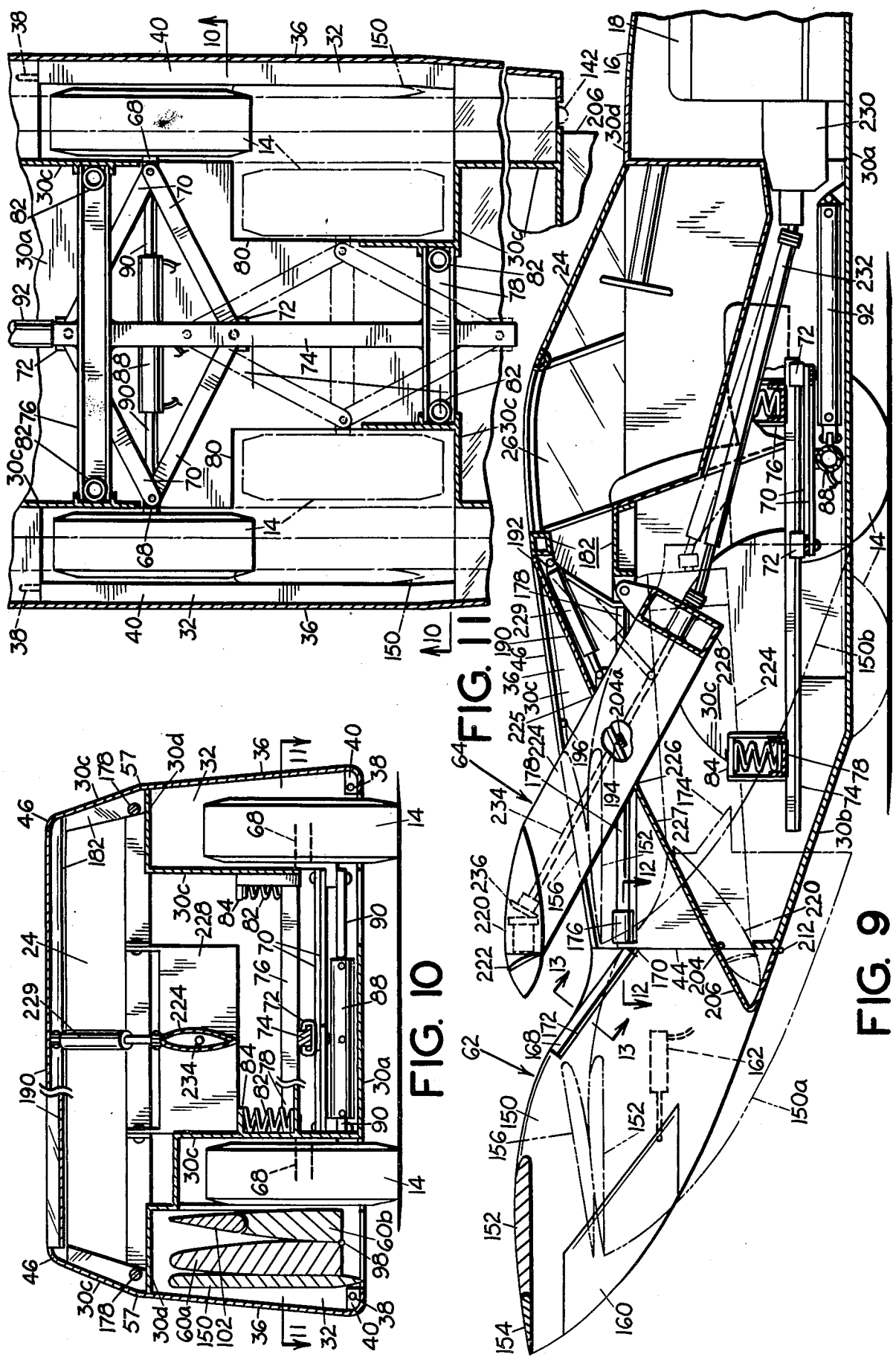

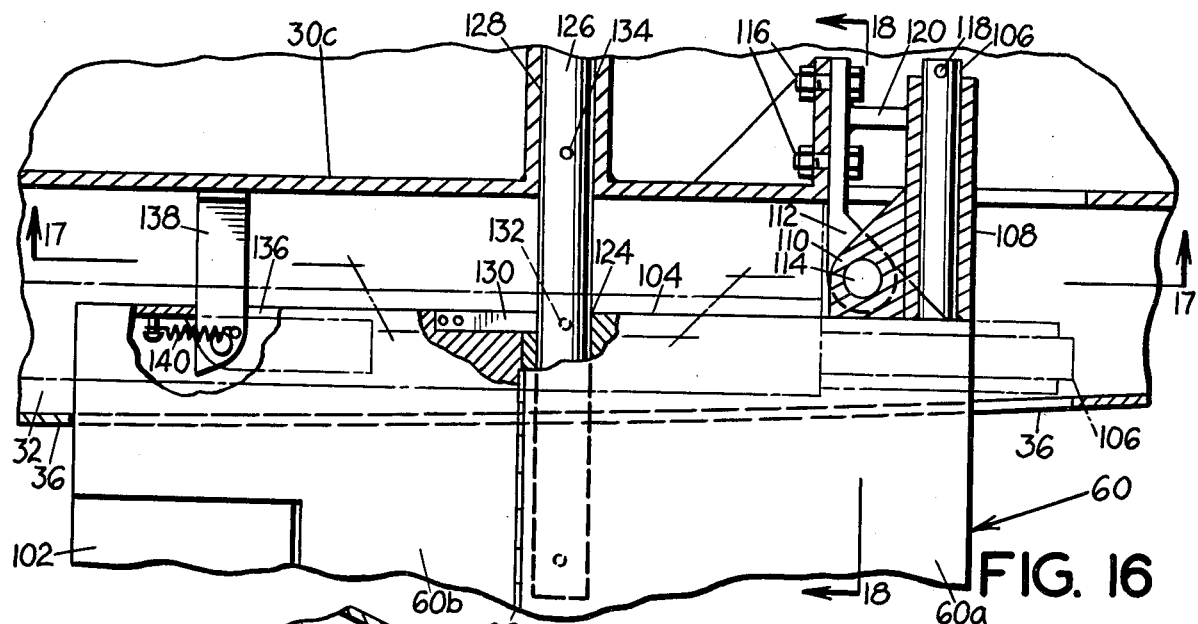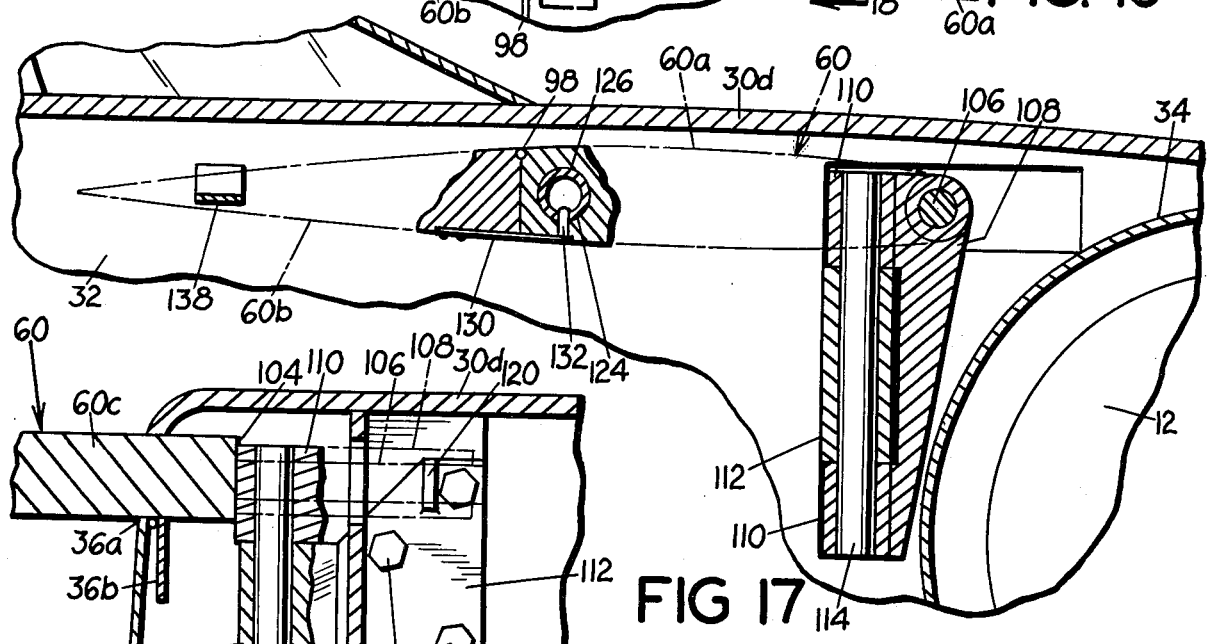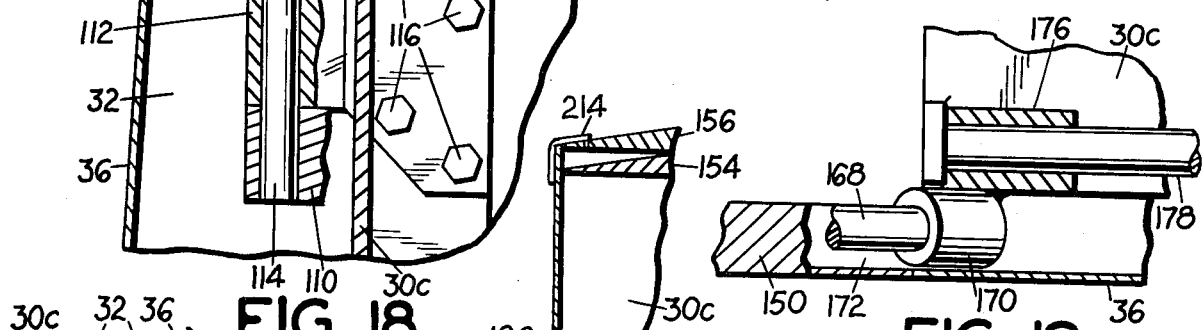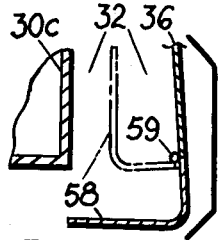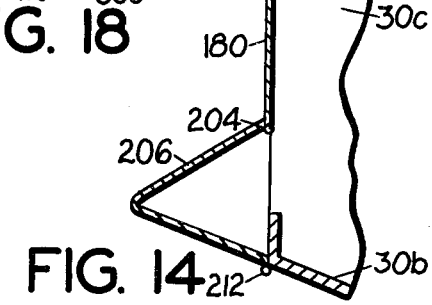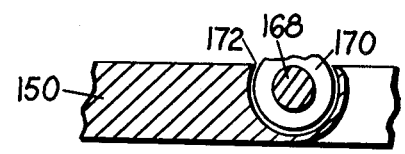

COMBINED ROAD VEHICLE AND AIRCRAFT

BACKGROUND OF THE INVENTION

This invention relates to new and useful improvements in a combined road vehicle and aircraft.

Combined road vehicle and aircraft structures have heretofore been provided wherein by converting certain elements, the vehicle can be operated on the highway or in the air. Such prior structures have the disadvantage that they are not capable of quick conversion from one form to the other and in addition some of the converting parts must be removed and stored or hauled separately until the time comes to change them back. It is believed that such lack of design has discouraged the widespread use of this type of apparatus.

SUMMARY OF THE INVENTION

According to the present invention and forming a primary objective thereof, a combined road vehicle and aircraft structure is provided which overcomes the deficiencies of the prior art mentioned above.

In carrying out such objective, the apparatus includes wing and tail assemblies as well as propelling means all arranged to be conveniently moved outwardly into flying position or inwardly into stored position in suitable compartments with all the parts thereof remaining intact for both uses. Novel means are provided in the structure for holding and/or compacting the aircraft portions into the body of the apparatus for the road form. Wheel means for the apparatus comprises a pair of front wheels and a pair of rear wheels, the rear wheels being movable between a narrowed rearward position for road use and a forward widened position for air use.

The invention will be better understood and additional objects and advantages will become apparent from the following description taken in connection with the accompanying drawings.

BRIEF DESCRIPTION OF THE DRAWINGS

FIGS. 1, 2, 3 and 4 are side elevational views of the present combined road vehicle and aircraft, these views showing various steps in the conversion of the road vehicle form to the aircraft form;

FIGS. 5 and 6 are top plan and rear elevation views, respectively, of the invention in its road vehicle form;

FIGS. 7 and 8 are top plan and rear elevational views, respectively, of the invention in its aircraft form;

FIG. 9 is a fragmentary longitudinal sectional view taken on the line 9—9 of FIG. 7, this view including broken lines illustrating converting positions of the invention from one form to the other;

FIG. 10 is a foreshortened, vertical cross sectional view taken on the line 10—10 of FIG. 11;

FIG. 11 is a fragmentary sectional view taken on the line 11—11 of FIG. 10;

FIGS. 12 and 13 are enlarged fragmentary sectional views taken on the lines 12—12 and 13—13, respectively, of FIG. 9;

FIG. 14 is an enlarged fragmentary sectional view taken on the line 14—14 of FIG. 5;

FIG. 15 is an enlarged fragmentary sectional view taken on the line 15—15 of FIG. 1;

FIG. 16 is an enlarged fragmentary sectional view taken on the line 16—16 of FIG. 4; and FIGS. 17 and 18 are fragmentary sectional views taken on the lines 17—17 and 18—18, respectively, of FIG. 16.

DETAILED DESCRIPTION OF A PREFERRED EMBODIMENT

With particular reference to the drawings, FIGS. 1, 5 and 6 show the present invention 10 complete in its road vehicle form and FIGS. 4, 7, and 8 show the invention complete in its aircraft form. FIGS. 2 and 3 show steps in the conversion of the invention from the road vehicle form to the aircraft form. The apparatus includes front wheels 12 and rear wheels 14 and a front compartment 16, FIG. 9, for an engine 18 of conventional design providing drive for wheels 12 in a conventional front wheel drive arrangement. The apparatus includes a front bumper 20 and front lights 22 arranged to serve either as headlights or landing lights. A cab portion 24 is disposed to the rear of the engine compartment, having suitable windshield and window means and also having a conventional lift up type door segment 26 providing access to the operator's compartment. Suitable controls, not shown, are provided in the operator's compartment for the road vehicle and aircraft forms.

The apparatus includes plate-like wall portions as the frame comprising a horizontal bottom wall portion 30a which, as best seen in FIG. 9, leads into an upwardly angled rear portion 30b. Also, as seen in FIG. 10, the frame also includes upright side wall portions 30c on each side and horizontal top portions 30d, these latter two wall portions being contoured to receive wheels 14 in a manner to be described. Side compartments 32 are provided on the outer sides of the wall portions 30c, the forward ends of these compartments being closed by wheel wells 34, FIG. 17, for the front wheels. The rearward ends of these compartments and the bottom are open. Outer wall panels 36 best shown in FIGS. 1, 4 and 10, cover the outer sides of compartments 32. These panels have front projecting pins 38, FIGS. 10 and 11, slidably engaged in suitable apertures in front frame portions 40, such panels being releasably supported on the apparatus by such pins and by releasable latches 42, FIG. 1, at an upper portion thereof engageable with the frame.

A profile of the side frame portions 30c is defined by a contour along bottom wall portions 30a and 30b, FIGS. 4 and 9, vertically at the rear along a line 44, forward along a top line 46 from such rear line to the cab 24, downwardly along a line 48 behind the cab, forwardly along the cab on a line 50, downwardly a short distance on a line 52 from the front of the line 50, forward on a line 54, and down along a line 55 around the wheel well 34. The rear upper portions along lines 44, 46 and 48 form permanent upstanding frame panels of frame 30c. The side panels 36 assume a similar side profile as the side frame members except that a top portion thereof extends along a line 57, FIG. 4, rather than extending along lines 46 and 48. Also, the side panels 36 do not angle up at the rear along contour 30b of the frame. However, in order to allow rotation of the aircraft in take-off and yet provide a full side cover when these panels are in the road vehicle form, the rear thereof is provided with auxiliary sections 58, FIGS. 1 and 15, which have suspended hinged connection 59 with the panels 36. These sections have a right angle extension arranged to project up into compartments 32. These hinged sections are positioned down in the road vehicle form of the apparatus to fill out the angled cut-out section at the rear but are rotated up to the broken line position shown in FIG. 15 in the aircraft form so that they will not be in the way when the aircraft rotates upwardly in take-off. Side panels 36 have cut-out portions 36a, FIGS. 4 and 18, to receive wings of the aircraft, to be described, and these portions are associated with auxiliary hinged panel sections 36b, FIGS. 1 and 18, arranged to close these cut-out portions when such wings are not in use. The tops of compartments 32 are closed by extended portions of top walls 30d, FIG. 18, of the frame.

The apparatus of the invention includes wings 60, FIGS. 4, 7 and 8, a tail assembly 62, FIGS. 2–4 and 7–9, and a propeller assembly 64, FIGS. 3, 4 and 7–9. The wing, tail and propeller assemblies are movable between retractable positions in the road vehicle form and extended positions for the flying form, the wing assemblies being folded into the side compartments 32 and the tail assembly 62 and propeller assembly 64 being compacted into the rear portion of the apparatus in the road vehicle form. The wheels 14 are also movable between extended and retracted positions, such wheels being disposed in the side compartments 32 in their extended position when the wings are in flying position but are retracted out of the wing compartments 32 when the wings are folded into the compartments in the road vehicle form. Details of these parts will now be described.

With reference to FIGS. 10 and 11, the rear wheels 14 have supporting spindles 68 pivotally connected and supported by a toggle linkage mechanism 70 pivotally connected to slide frames 72 having guided slidable connection to a longitudinal rigid rail 74. Rail 74 is secured integrally at its forward end to a cross channel frame member 76 and at its rearward end to cross channel frame member 78. Frame member 78 is of less length than the frame member 76, the side frame walls 30c as stated hereinbefore having offset portions to accommodate this difference. The bottom frame wall 30a has rear wells 80 to form wheel receiving compartments in this offset area. Frame members 76 and 78 support pairs of front and rear suspension springs 82 in turn supporting the frame of the apparatus by means of bearing plates 84 integral with the frame.

A double acting fluid operated cylinder 88 has oppositely extending piston rods 90 pivotally connected to the respective spindles 68, and operation of the cylinder 88 is arranged to move the wheels 14 through the medium of the toggle mechanism 70 between the full line and dotted positions of FIG. 11 and vice versa. A longitudinally extending double acting fluid operated cylinder 92, also seen in FIG. 9, is pivotally connected between the cylinder 88 and a forward portion of the frame, and this cylinder is arranged to move the wheel assembly between the two positions illustrated in FIG. 11. Thus, it is apparent that by selected operation of these two cylinders, the wheels can be moved from a forward expanded position to a rearward retracted position. The offset sectional view of FIG. 10 shows the two positions of the wheels in full lines for purposes of illustration.

The rearward retracted position of the wheels 14 is used when the apparatus is in its road vehicle form. Such rearward position of these wheels forms an elongated wheel base for the road vehicle and the inward retracted position at the same time provides clearance in the compartments 32 for receiving the wings 60 as will be described. When the wings are in flying form, the wheels 14 are moved to their forward position which provide for proper balance of the aircraft for flying as well as proper rotation of the aircraft for take-off. The upward angled profile 30b of the frame allows adequate rotation of the aircraft for take-off.

With particular reference to FIGS. 7, 16 and 17, the wings 60 are made up of two main parts 60a and 60b, and these two parts have a top hinged connection 98. Wing part 60b has suitable flaperons 102 on its trailing edge in a conventional manner. Wings 60 have an inner edge 104, and projecting inwardly from such inner edge adjacent the front of the wing is a spindle 106. This spindle is rotatably received in an elongated socket 108 having projections 110 pivotally attached to a bracket 112 by means of a vertical pivot pin 114. Bracket 112 is securely fixed to the upright frame portion 30c by bolts 116 or other suitable means. Spindle 106 is securely held in its socket 108 by a lock pin 118. Forward rotation of the wing on the pivot 114 is limited by an abutment 120 secured to the bracket 112 and engageable by the socket 108.

The rearward portion of wing sections 60a has a socket 124 leading inwardly from the inner edge 104, and this socket is arranged to receive a support bar 126 also arranged to extend into a socket 128 in the frame portion 30c. A latch 130 is secured to the wing section 60b and has latch pin engagement 132 with the support bar 126 to hold the two wing sections 60a and 60b in an unfolded straight line position. Sockets 124 and 128 have latch pins 134 releasably engaged with the support bar 126.

Socket 124 is elongated in the wing section 60a relative to the associated end of support bar 126 in its installed position, and for the purpose of pivoting the wing from the horizontal flying position to a vertical folding position on its spindle 106, latch pins 134 are removed and the bar 126 moved into the socket 124 a distance sufficient such that the end that has been installed in socket 128 can be retracted to clear the frame wall 30c.

The inner edge 104 of wing section 60b adjacent the rear thereof has an opening 136 receiving an abutment finger 138. This finger is pivotally attached to the wing section and a tension spring 140 is connected between such finger and the wing section in an arrangement to provide a first position within the wing parallel with the edge 104, as shown in broken lines, and a second position at right angles to such edge, as shown in full lines. In the latter position of the finger 138, it abuts against the frame wall 30c to stabilize the wing against rearward thrust during flight. This finger at other times can be folded into the wing. The ends of the wings have combination navigation and tail lights 142.

The tail assembly 62 comprises a pair of side vertical stabilizers 150, FIGS. 2–4, 8 and 9, connected together at the top thereof by an integral horizontal stabilizer 152, also seen in FIG. 7. Stabilizer 152 has the conventional elevators 154. Horizontal stabilizer 152 has side extensions 156 secured thereto by hinge means 158 of a structure providing outward and inward folding of such side extensions and also in the outward folded position holding them firmly latched in the extended relation. Vertical stabilizers 150 have the usual rudders 160 controlled in a conventional manner such as by fluid operated cylinders 162, FIG. 9. Likewise, elevator 154 may be suitably controlled by a fluid operated cylinder 164, FIG. 7.

The stabilizers 150 are disposed in a vertical line exteriorly of the respective side frame walls 30c but in alignment with the side compartments 32. Each of the stabilizers has a rod 168, FIGS. 9, 12 and 13, secured thereto slidably engaged in a head 170. An elongated groove 172 is provided on the inside surface of the stabilizers to allow movement of the stabilizer relative to the head 170. As seen in FIG. 9, the rod 168 angles down whereby when the stabilizers are moved so that the rods 168 slide through the heads 170, the stabilizers will move to a lower plane, such lower plane being shown in broken lines in FIG. 9 and being designated by the numeral 150a. The groove 172 extends downwardly in the stabilizers so as to accommodate its rod 168 in a fully down position, the stabilizers having extensions 174 at their front ends to provide the length of groove necessary.

Stationary heads 170 are integral with horizontal sleeves 176 slidable on rods 178 secured at their rearward ends to a frame portion 30c. The front of rods 178 is secured to a cross frame 182 integral with the main frame of the apparatus at a forward location. In addition to the stabilizer assembly being movable to a lower plane by slidable movement of rods 168 through the heads 170, such assembly can be slid horizontally forward on the rods 178. By such a combined movement, the stabilizer assembly can be moved inwardly to the position designated in FIG. 9 by the numeral 150b.

With particular reference to FIG. 9, the rear portion of the apparatus has a transparent roof panel 190 extending from a pivot connection 192 at the rear of the cab 24 and terminating in a rearward edge 194. This roof panel in the vehicle form of the apparatus is held in an upward pivoted position by latch members 196 on side frame portions 30c. The rearward end of the apparatus has a wall 180, best seen in FIG. 14, releasably connected at its lower end to opposed latches 204 on opposite wall portions 30c. Also releasably connected to latches 204 is an angular wall segment 206 pivotally connected at 212 to bottom frame portion 30b. Wall segment 206 serves as a bumper for the apparatus when converted to its vehicle form. The top wall 180 has latches 214 arranged for releasable engagement with the hinged stabilizers 156 in the folded position of the latter. Latches 204 and 214 hold the rear wall 180 in place but upon release of such latches such wall can be removed and stored.

Propeller assembly 64 has a propeller housing 220 and a propeller 222, and such housing is supported on a pylon 224 extending through a slot 225 in wall 190, best seen in FIG. 7, and also through a slot 226 in an angled wall 227 extending up to the lower edge of wall 190. The rearward end of wall 227 is releasably secured to latches 204 and its forward end is releasably secured to a latch member 204a on the sides of the pylon. The rearward end of roof panel 190 is also releasably secured to latch member 204a. Pylon 224 is secured at its bottom end to a frame 228 hingedly supported on the cross frame 182. A fluid operated piston assembly 229 connected between the pylon and frame 228 is arranged to raise and lower the pylon. Propeller 222 is driven by the engine 18 through a transmission 230 the output of which drives a first drive shaft 232 having a spline connection with a second drive shaft 234 extending upwardly through the pylon and having a bevel gear connection 236 with the propeller shaft.

In the road vehicle form of the apparatus as seen in FIGS. 1, 5 and 6, the tail assembly is stored in the rear compartment of the apparatus and the wings are stored in the side compartments 32. The rear panel sections 58 are down and the rear wall 180 is mounted in position by the latches 204 and 214. The propeller assembly is in its lowered position with the propeller end stored in the pocket formed by angled wall segment 206. The hinged stabilizers 156 form the roof for a rear portion of the rear compartment of the apparatus as shown in broken lines in FIG. 9. The roof for the front of such rear compartment is formed by the wall 190 which is now in its raised position with its rearward end supported on latch members 196. The rear wheels 14 are in their rearward retracted position. Panel sections 36b are closed to cover the cut-out portions 36a.

One manner of converting the apparatus from its road vehicle form to its aircraft form is as follows: The side panels 36 are first temporarily removed by releasing latch 42, FIG. 1. These panels are then shifted rearwardly an amount sufficient to clear the pins 38, FIG. 11, from their supporting apertures in the frame. This rearward movement of the side panels 36 is shown in broken lines in FIG. 1, whereupon these panels can now be laid aside. FIG. 2 shows the apparatus still in road vehicle form but with the panels 36 removed.

Thereupon the tail assembly 62 and propeller assembly 64 can be extended. This is accomplished by first removing the rear wall 180, FIG. 14, by release of latches 204 and 214. This wall is suitably secured in the vehicle until it is again needed. The tail assembly can then be moved rearwardly which by such movement on the rods 178 and 168 also raises it to its flying position. This outward position of the tail assembly is shown in FIG. 3. The hinged stabilizers 156 can then be folded out to their horizontal latched position. The propeller assembly is raised to the flying position by the piston 229, as shown in FIG. 3. Wall 227 is installed on its latches 204 and 204a. Wall 190 is lowered onto pylon 224 and latched to latch member 204a to form a streamlined rear portion aligned with angled wall 227.

Thereupon the wings 60 are pivoted forwardly out of the compartments 32 on pivots 114 to a right angle position with relation to the vehicle. The support bars 126 in these wings are then pulled outwardly from a storage position in their sockets 124 and extended into sockets 128 in the vehicle frame 30c. The latch pins 134 are installed in the support bar 126. The wings are unfolded on their hinges 98 so that the sections 60a and 60b thereof are in aligned flying form and latches 130 engaged to hold these sections rigid in such form. Abutment fingers 138 are swung outwardly for abutment against the frame portion 30c. The side panels 36 are then reinstalled by aligning the pins in their supporting apertures in the frame and then moving such panels forwardly to seat the pins. The panels are then swung upwardly and latched at 42, the auxiliary sections 36b of the side panels being in their lowered position to allow the cut-out portions 36a to fit the lower contour of the wings. The rear panel sections 58 are raised at the time that panels 36 are reinstalled.

Wheel 14 can now be shifted to their forward expanded position and the aircraft, as shown in its flying form in FIGS. 4, 7 and 8, is ready for takeoff. Stationary side panels 56 serve as vertical stabilizing means in flight.

One manner of converting the apparatus from its aircraft form to its road vehicle form can be substantially reversed from that described above, namely, the rear wheels are moved rearwardly and retracted inwardly by fluid operated cylinders 92 and 88. This moves such wheels out of the plane of the side compartments 32 so that the wings can be folded into such compartments. Side panels 36 are then unlatched at 42, shifted rearwardly to clear pins 38 from their apertures, and then set aside temporarily. Latch pins 134 can be removed and the support bars 126 moved inwardly in their sockets 124 so that the ends thereof which project into their sockets 128 clear such pockets. Abutment fingers 138 are rotated into the openings 136 so as to be out of the way. The wings can then rotate to a vertical position on their spindles 106 and wing sections 60b folded upwardly, after releasing latches 130. The entire wing assemblies can then be swung rearwardly on pivot pin 114 into their storage compartments 32. This storage position is shown at the left side in FIG. 10. Side panels 36 can then be reinstalled with the rear panel sections 58 pivoted to their down position. Wall 227 is removed and wall 190 raised to its upper position held by latch 196. Wall 206 is also unlatched and lowered.

The tail assembly 62 can then be moved inwardly, the hinged stabilizers 156 first being folded inwardly on top of the horizontal stabilizer 152. In the inward movement of the tail assembly, the vertical stabilizers pass into the compartments 32 on the outside of wing sections 60a, FIG. 10 as stated hereinbefore, the inward movement of the tail assembly, by reason of the angled rod support 168 and horizontal rod support 178, causes it to shift to a lower plane.

The propeller assembly 64 is lowered to a rest position on the frame and the segment 206 pivoted upwardly and latched at 204. In such upward folded position, the wall segment 206 forms a pocket to receive the propeller portion therein and as stated hereinbefore also comprises the rear bumper of the road vehicle. Wall 180 is installed in place. Clearance lights 140 of the wings in the folded position of the latter form the tail lights for the vehicle. Exhaust means 240, FIG. 6, extend rearwardly in a conventional manner.

According to the present invention, a combined road vehicle and aircraft is provided which is readily convertible from one form to the other. Such conversion can be accomplished by a single person if necessary without special tools and at a reasonably fast rate. In addition, all the parts of the two forms of vehicle are intact and thus are carried along with the apparatus. No trailing vehicles or other additional transportation means are required. It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A combined road vehicle and aircraft comprising
   (a) a frame having front, rear and side portions,
   (b) front wheel means on said frame,
   (c) rear wheel means on said frame comprising a pair of laterally spaced wheels,
   (d) a tail assembly on said frame,
   (e) wing assemblies on opposite sides of said frame to support the vehicle in the air,
   (f) side compartments in said vehicle,
   (g) converting means associated with said wing assemblies for moving them outwardly into flying position or for moving them inwardly into stored position in said side compartments,
   (h) propelling means on said frame for driving the vehicle in the air,
   (i) power means on said frame for driving the propelling means and for driving some of said wheel means,
   (j) and laterally expandable and retractible means on said frame attached to said rear wheels arranged to move said rear wheels outwardly into said side compartments during the air use of the vehicle and to move said rear wheels inwardly relative to said compartments during the road use of the vehicle to provide storage room in said compartments for said wing assemblies.

2. The combined road vehicle and aircraft of claim 1 wherein said laterally expandable and retractible means includes a parallelogram linkage.

3. The combined road vehicle and aircraft of claim 1 wherein said laterally expandable and retractible means is also arranged to move said rear wheels forwardly and rearwardly and includes a parallelogram linkage, and powered means for operating said linkage to move said rear wheels forwardly and rearwardly and also to move said rear wheels laterally.

4. The combined road vehicle and aircraft of claim 1 including a rear compartment in said vehicle and means on said frame arranged to support said tail assembly in flying position and to slide said tail assembly forwardly and downwardly for storage in said rear compartment during road use of the vehicle.

5. The combined road vehicle and aircraft of claim 4 including means for lowering said propelling means into said rear compartment during road use of the vehicle.

* * * * *